UNITED STATES PATENT OFFICE.

DANIEL C. FISCHEL, OF TROY, NEW YORK.

ARTIFICIAL FUEL.

SPECIFICATION forming part of Letters Patent No. 455,492, dated July 7, 1891.

Application filed January 5, 1891. Serial No. 376,772. (No specimens.)

*To all whom it may concern:*

Be it known that I, DANIEL C. FISCHEL, a citizen of the United States of America, residing at Troy, in the county of Rensselaer, in the State of New York, have invented certain new and useful Improvements in Artificial Fuel, of which the following is a specification.

My invention relates to a composition of matter in which vegetable refuse or garbage is an ingredient whereby such matter may be utilized as fuel.

The invention consists in a composition of matter composed of carbonated or charred vegetable residue, coal-dust or soft coal, a heat-retainer, such as powdered furnace-slag, powdered marine shells, and crude mineral oil and resin.

In making this composition garbage or vegetable refuse is roasted over a slow furnace or in a kiln until it is dried and charred to such an extent as to contain not less than fifty per cent. of free carbon. This charring of the vegetable matter thoroughly disinfects it, renders it inflammable, and puts it in condition to burn without obnoxious odors or gases. The heat-retaining material—such as furnace-slag, fire-clay, or argillaceous rock—is pulverized. The oxidizing material—such as clam, oyster, or other marine shells—is also pulverized. These ingredients are mixed with a binding material composed of coal-tar, one part; crude resin, two parts, and crude oil, two parts. These ingredients are mixed in various proportions and the mixture is moistened with boiling water and pressed into compact bricks and dried.

The following is an example of a formula for this composition: charred vegetable refuse, fifty pounds; coal-dust, fifteen pounds; heat-retaining material, such as pulverized furnace-slag, fire-clay, or argillaceous rock, twenty pounds; oxidizing material, such as pulverized marine shells, ten pounds; binding material, as described, five pounds; total, one hundred pounds.

One pound of quicklime may be used as an additional binding material.

Coal-dust may be used in a larger proportion in place of the charred vegetable matter.

I claim as my invention—

A composition of matter for an artificial fuel, consisting of charred garbage, coal-dust, furnace-slag, powdered marine shells, coal-tar, rosin, and crude oil, substantially as set forth.

In testimony that I claim the invention above set forth I affix my signature in presence of two witnesses.

DANIEL C. FISCHEL.

Witnesses:
JOHN T. NORTON,
JOHN W. RODDY.